United States Patent
Chen et al.

(10) Patent No.: US 8,798,286 B2
(45) Date of Patent: *Aug. 5, 2014

(54) SYSTEM AND METHOD OF PROVIDING AUDIO CONTENT

(75) Inventors: Zesen Chen, Pleasanton, CA (US); Peter Chou, San Ramon, CA (US); Steve Aspell, Brentwood, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 357 days.

This patent is subject to a terminal disclaimer.

(21) Appl. No.: 13/193,241

(22) Filed: Jul. 28, 2011

(65) Prior Publication Data

US 2011/0283316 A1    Nov. 17, 2011

Related U.S. Application Data

(63) Continuation of application No. 11/267,564, filed on Nov. 4, 2005, now Pat. No. 8,014,542.

(51) Int. Cl.
*H04B 3/00*    (2006.01)

(52) U.S. Cl.
USPC ............ 381/77; 381/110; 725/100; 725/131; 725/139; 725/151; 725/135

(58) Field of Classification Search
USPC ........ 381/110, 77; 725/38, 100, 131, 139, 39, 725/44–47, 135, 142, 145, 151; 715/728; 704/275

See application file for complete search history.

(56) References Cited

U.S. PATENT DOCUMENTS

| | | | |
|---|---|---|---|
| 5,333,056 A * | 7/1994 | Powell | 348/738 |
| 6,237,060 B1 * | 5/2001 | Shilts et al. | 711/100 |
| 6,456,978 B1 | 9/2002 | Wymore et al. | |
| 6,543,052 B1 | 4/2003 | Ogasawara | |
| 6,766,290 B2 | 7/2004 | Grau | |
| 7,603,683 B2 * | 10/2009 | Reto | 725/34 |
| 2003/0103627 A1 * | 6/2003 | Nierzwick et al. | 380/240 |
| 2003/0133558 A1 * | 7/2003 | Kung et al. | 379/215.01 |
| 2004/0128139 A1 | 7/2004 | Ilan et al. | |
| 2004/0208324 A1 * | 10/2004 | Cheung et al. | 381/77 |
| 2005/0033825 A1 | 2/2005 | Miller et al. | |
| 2005/0114141 A1 | 5/2005 | Grody | |
| 2005/0172319 A1 * | 8/2005 | Reichardt et al. | 725/52 |
| 2006/0242665 A1 * | 10/2006 | Knee et al. | 725/38 |

* cited by examiner

*Primary Examiner* — Paul Kim
(74) *Attorney, Agent, or Firm* — Toler Law Group, PC

(57) ABSTRACT

A method includes receiving input from a remote control device at a set-top box device. The input identifies media content that includes audio content and video content. The input also indicates that the audio content is to be output via an audio output device coupled to the set-top box device without sending the video output from the set-top box device to an external display device coupled to the set-top box device. The method includes determining whether the media content is stored at a local memory device of the set-top box device. When the media content is stored at the local memory device, the method includes retrieving the media content from the local memory, sending a first audio signal corresponding to the audio content of the media content to the audio output device and blocking output of the video content to the external display device.

20 Claims, 7 Drawing Sheets

SYSTEM AND METHOD OF PROVIDING AUDIO CONTENT

CLAIM OF PRIORITY

This application is a Continuation patent application of, and claims priority from, U.S. patent application Ser. No. 11/267,564, filed on Nov. 4, 2005, and entitled "SYSTEM AND METHOD OF PROVIDING AUDIO CONTENT," which is hereby incorporated by reference in its entirety.

FIELD OF THE DISCLOSURE

The present disclosure is generally related to providing audio content.

BACKGROUND

Many people enjoy multimedia content. Television and films provide sources of information and entertainment that envelop the senses more than other forms of recreation, such as reading. Additionally, some multimedia outlets provide multiple unrelated types of information, in conjunction with news or entertainment programs. As a result, display space within a user's primary field of vision, such as during a television program, is valuable and often crowded, as information and content providers compete for the user's attention.

One consequence of multimedia entertainment is the distraction that it causes. The brightness of many displays and the availability of desired content on demand can divert a user's attention from other tasks, such as reading or supervising children, even during an informational program. In many cases, users may wish to listen to audio content, including recorded music, live radio broadcasts, or the audio portion of a television program or recorded movie. However, gaining access to so many forms of audio content requires the user to purchase and operate separate entertainment devices, such as a television, stereo receiver, set-top box, and DVD player. The proximity and time required to manipulate these different devices can also detract from other activities, even where each device may be operated by a remote control.

DETAILED DESCRIPTION

A set-top box device includes an audio input device that is configured to receive a voice command. The set-top box device may also include a display disposed on a visible side of a set-top box housing. Additionally, the set-top box device includes a media control logic module configured to retrieve audio content identified by the voice command and data related to the audio content. The media control logic module is also configured to transmit an audio signal corresponding to the audio content to an audio output device. The data related to the audio content is displayable on the display.

In another embodiment, a system to provide audio content includes a set-top box device and an access network coupled to the set-top box device via a transmission facility. The access network is adapted to receive audio content from an audio server and to provide the audio content to the set-top box device. The set-top box device is configured to transmit an audio signal corresponding to the audio content to an output device of the set-top box device, and the set-top box device is configured to transmit the data to a display disposed on a visible side of the set-top box device.

In another embodiment, a method of providing audio content includes receiving a voice command at an audio input device of a set-top box device, where the voice command identifies audio content. The method also includes outputting an audio signal corresponding to the audio content via at least one speaker coupled to the set-top box device. Further, the method includes displaying data related to the audio content via a display disposed on a visible side of the set-top box device.

In another embodiment, a computer program embedded in a computer-readable media includes instructions to retrieve audio content selectable by a voice command received at an audio input of a set-top box device, where the voice command identifies audio content. The computer program also includes instructions to transmit an audio signal corresponding to the audio content to an audio output device and instructions to transmit data related to the audio content to a display disposed on a visible side of the set-top box device.

Figure 1:
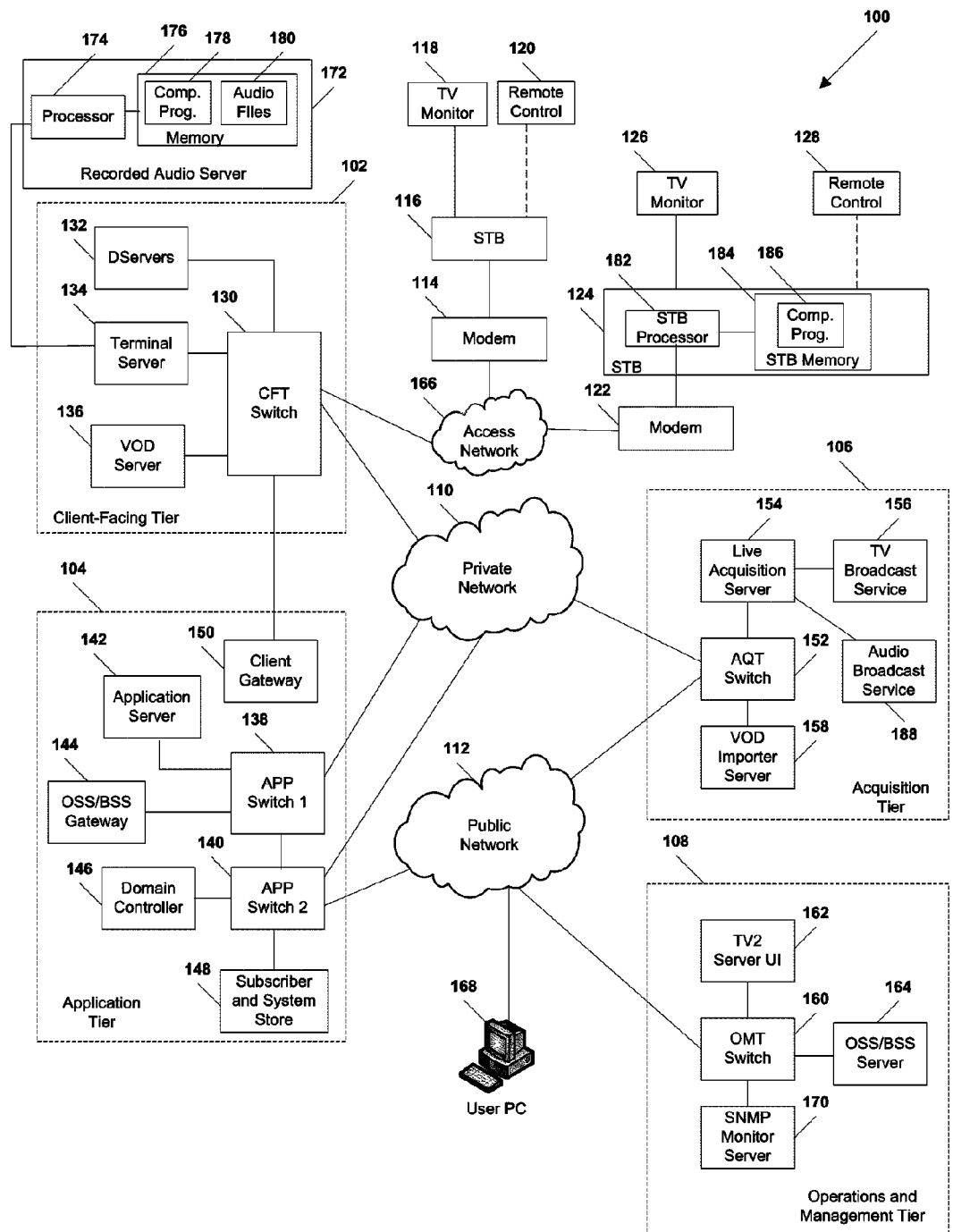
FIG. 1 is a block diagram illustrating an embodiment of an Internet Protocol Television (IPTV) system.

Referring to FIG. 1, an illustrative embodiment of an Internet Protocol Television (IPTV) system that may be used to supply audio content to a set-top box is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

As illustrated in FIG. 1, the client-facing tier 102 can communicate with user equipment via a private access network 166, such as an Internet Protocol Television (IPTV)

access network. In an illustrative embodiment, modems, such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes, such as the representative set-top boxes 116, 124, over a wide geographic area, such as a regional area, a metropolitan area, a viewing area, or any other suitable geographic area that can be supported by networking the client-facing tier 102 to numerous set-top box devices.

In one embodiment, the client-facing tier 102 can be coupled to the modems 114, 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the private access network 166, via an IPTV software platform, such as Microsoft® TV IPTV Edition.

Additionally, the first set-top box device 116 can be coupled to a first external display device 118, such as a first television monitor, and the second set-top box device 124 can be coupled to a second external display device 126, such as a second television monitor. Moreover, the first set-top box device 116 can communicate with a first remote control 120, and the second set-top box device can communicate with a second remote control 128.

In an exemplary, non-limiting embodiment, each set-top box device 116, 124 can receive audio, data, video, or a combination thereof, from the client-facing tier 102 via the private access network 166. The set-top box 116, 124 can output the audio, display the data, or transmit the video to an external display device, such as a television monitor 118, 126. Further, the set-top box devices 116, 124 can include a STB processor, such as STB processor 182 and a STB memory device, such as STB memory 184 that is accessible to the STB processor 182. In a particular embodiment, the set-top box devices 116, 124 can also communicate commands received from the remote control devices 120, 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a recorded audio server 172 and other devices, with a common connection point to the private network 110. In a particular embodiment, the CFT switch 130 can also be coupled to a video-on-demand (VOD) server 136.

As illustrated in FIG. 1, the application tier 104 can communicate with both the private network 110 and the public network 112. The application tier 104 can include a first application (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116, 124 via the private access network 166, so the set-top box devices 116, 124 can provide functions, such as display, messaging, processing of IPTV data and VOD material, etc. In a particular embodiment, the OSS/BSS gateway 144 includes operation systems and support (OSS) data, as well as billing systems and support (BSS) data.

Further, the second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116, 124 can access the IPTV system 100 via the private access network 166 using information received from the client gateway 150. In this embodiment, the private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when a set-top box device 116 accesses the system 100 via the private access network 166, the client gateway 150 can verify subscriber information by communicating with the subscriber and system store 148 via the private network 110, the first APP switch 138, and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138 to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116 (e.g., because it is connected to an unauthorized twisted pair), the client gateway 150 can block transmissions to and from the set-top box device 116 beyond the private access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. Further, the AQT switch can be coupled to a video-on-demand importer server 158 that stores television content received at the acquisition tier 106 and communicates the stored content to the client-facing tier 102 via the private network 110.

In a particular embodiment, the AQT switch 152 can be coupled to a live acquisition server 154 that receives television content, for example, from a broadcast service 156. In another particular embodiment, the live acquisition server 154 can receive audio content from an audio broadcast service 188, such as a radio broadcast service or a satellite radio broadcast service. Moreover, the live acquisition server 154 can receive audio content from the domain controller 146, via the public network 110 or private network 112, such as Internet radio broadcast content.

In a particular embodiment during operation of the IPTV system, the live acquisition server 154 can acquire television content, audio content, or a combination thereof. The live acquisition server 154 can transmit the television or audio content to the AQT switch 152, in turn, and the AQT switch 152 can transmit the television or audio content to the CFT switch 130 via the private network 110. Further, the television content can be encoded at the data servers 132, and the CFT switch 130 can communicate the television or audio content to the modems 114, 122 via the private access network 166. The set-top box devices 116, 124 can receive the television or audio content via the modems 114, 122, and output the audio content or the audio portion of television content. In an illustrative embodiment, audio content or audio portions of television content can be streamed to the set-top box devices 116, 124.

Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When a user issues a request for VOD content via a set-top box device 116, 124, the request can be transmitted over the private access network 166 to the VOD server 136 via the CFT switch 130. Upon receiving such a request, the VOD server 136 can retrieve the requested VOD content and transmit the content to the set-top box device 116, 124 across the private access network 166, via the CFT switch 130. The set-top box device 116, 124 can output the audio portion of the VOD content. In an illustrative embodiment, audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 170 that monitors network devices. In a particular embodiment, the OMT switch 160 can communicate with the AQT switch 152 via the public network 112.

In an illustrative embodiment, the live acquisition server 154 can transmit the television content to the AQT switch 152, and the AQT switch 152, in turn, can transmit the television content to the OMT switch 160 via the public network 112. In this embodiment, the OMT switch 160 can transmit the television content to the TV2 server 162 for display to users accessing the user interface at the TV2 server 162. For example, a user can access the TV2 server 162 using a personal computer (PC) 168 coupled to the public network 112.

As illustrated in FIG. 1, the system 100 can include a recorded audio server 172. The recorded audio server 172 includes a processor 174 and a memory device 176 that is accessible to the processor 174. The recorded audio server 172 can also include a computer program 178 that is embedded within the memory device 176. Additionally, the memory device 176 can also include one or more audio content files 180, which store audio content and data related to the audio content. In a particular embodiment, the computer program 178 can include instructions to communicate with the terminal server, in order to receive requests for audio content from the set-top box devices 116, 124. In an illustrative embodiment, the audio content can be identified by one or more voice commands received at the set-top box devices 116, 124. The computer program 178 can retrieve the requested audio content from the stored audio files 180 and transmit the audio content and data related to the audio content to the set-top box devices 116, 124, via the private access network 166. In an illustrative embodiment, audio content or audio portions of television content can be streamed to the set-top box devices 116, 124.

In a particular embodiment, the set-top box devices 116, 124, can output the audio content via one or more output devices that are coupled thereto, or integrated therewith, such as one or more speakers. Moreover, the set-top box devices 116, 124, can transmit the data related to the audio content to a display disposed on a visible side thereof.

In another embodiment, the VOD server 136 can receive requests for VOD content from the set-top box devices 116, 124. The VOD server 136 can transmit the VOD content and data related to the VOD content across the private access network 166 via the CFT switch 130 to a modem 114, 122 that is coupled to the set-top box devices 116, 124. In a particular embodiment, the set-top box devices 116, 124 can output the audio portion of the VOD content via one or more output devices that are coupled thereto, or integrated therewith, such as one or more speakers. Moreover, the set-top box devices 116, 124, can transmit the data related to the audio content to a display disposed on a visible side thereof. In an illustrative embodiment, the set-top box device, such as set-top box devices 116, 124, can filter the video content from the VOD content and not transmit the video content to external display devices, such as television monitors 118, 126.

In an additional embodiment, the live acquisition server 154 can receive requests for broadcast content from the set-top box devices 116, 124. The live acquisition server 154 can transmit television broadcast content from the television broadcast service 156, audio content from the audio broadcast service 188, Internet audio content from the domain server 146, or a combination thereof across the private access network 166 to the set-top box devices 116, 124. Additionally, the live acquisition server 154 can transmit data related to the broadcast television content, broadcast audio content, or both to the set-top box devices 116, 124. In a particular embodiment, the set-top box devices 116, 124 can output the audio portion of the broadcast television or the broadcast audio content via one or more output devices that are coupled thereto, or integrated therewith, such as one or more speakers. Further, the set-top box devices 116, 124 can transmit the data related to the broadcast television or broadcast audio content to a display disposed on a visible side thereof. In an illustrative embodiment, the set-top box devices 116, 124 can filter the video content from the broadcast television content and not transmit the video content to external display devices, such as television monitors 118, 126.

Figure 2:
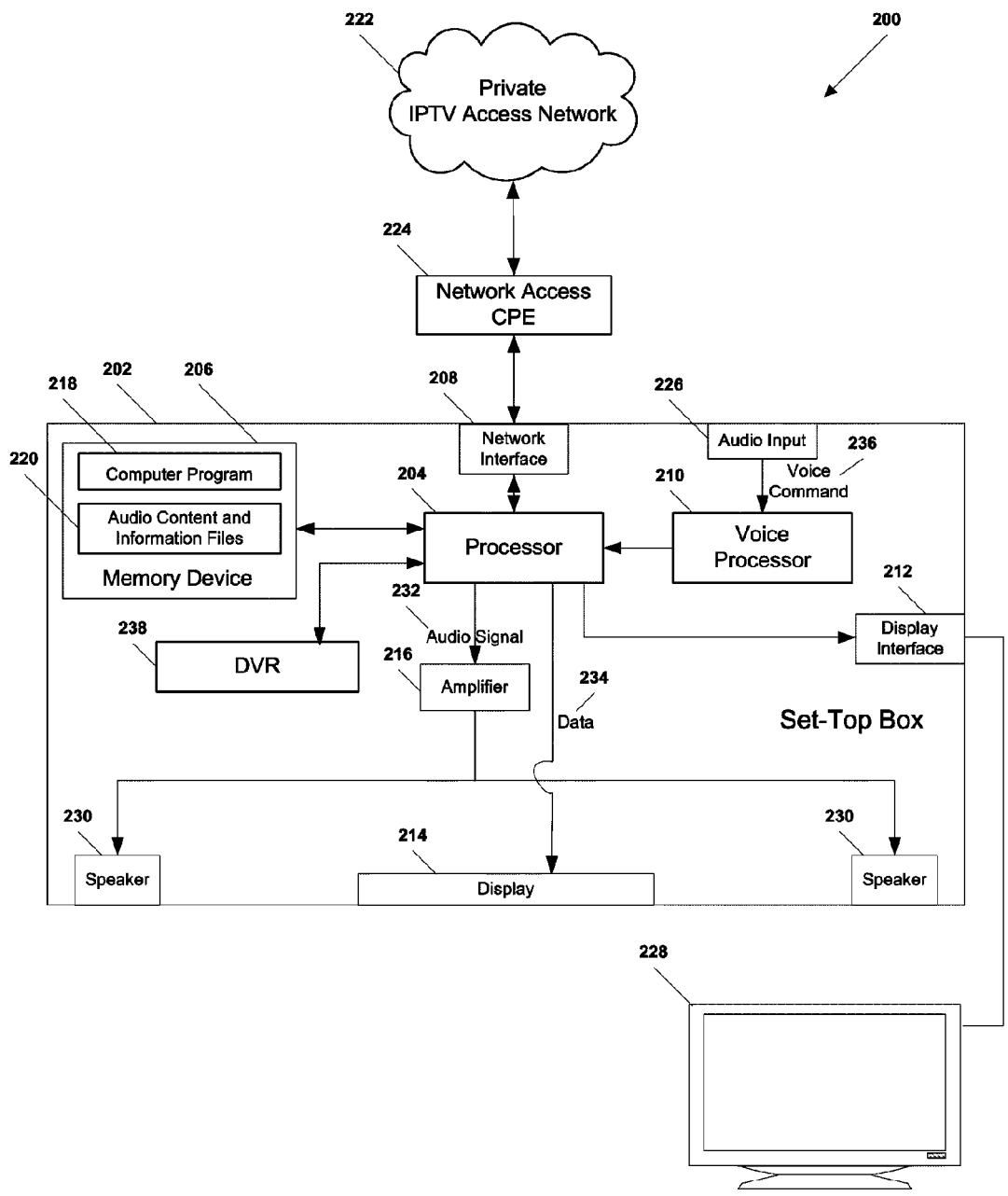
FIG. 2 is a block diagram illustrating an embodiment of a system to provide audio content.

Referring to FIG. 2, an embodiment of a system to provide audio content is illustrated and is generally designated 200. The system includes a set-top box 202 that contains a processor 204. A memory device 206 is accessible to the processor 204. Additionally, the processor 204 is coupled to a network interface 208 and a voice processor 210. Further, the processor 204 can be coupled to a display interface 212, such as a television interface, through which the set-top box device 202 can communicate multimedia content to an external television monitor 228. The processor 204 is also coupled to a display 214 that is disposed on a visible side of a housing of the set-top box device 202. The housing is illustrated further in FIG. 6. In a particular embodiment, the processor 204 can be coupled to an audio amplifier 216.

In a particular embodiment, the memory device 206 can store a computer program 218. The memory device 206 can also contain audio content and information files 220 that include audio content and data related to the audio content. In an illustrative embodiment, the audio content and information files 220 can include a digital music library with metadata associated with each audio content file.

In another particular embodiment, the processor 204 can communicate with a private Internet Protocol Television (IPTV) access network 222 via the network interface 208. In an illustrative embodiment, a data interface, such as network access customer premises equipment (CPE) 224, can facilitate communication between the network interface 208 and the private IPTV access network 222. The network access CPE 224 can include a router, local area network device, a modem, such as a digital subscriber line (DSL) modem, any other suitable device for facilitating communication between the network interface 208 of the set-top box device 202 and the IPTV access network 222, or any combination thereof.

The processor 204 may receive audio inputs, such as voice commands, from an audio input device 226 via the voice processor 210. The voice processor 210 can include logic to separate voice commands 236 from audio output by its speakers or externally generated sounds, for example, through voice recognition or by identifying keywords or menu modes that precede voice commands 236, such as 'command,' 'playlist menu,' or 'file library browsing menu.' The audio input device 226 can be a microphone or other transceiver device that is suitable for capturing audio sounds within a pre-defined distance and space proximate to the set-top box device 202. For example, the audio input device 226 can be a linear microphone that captures voice commands that are issued from a pre-defined distance in front of the audio input device 226. Alternatively, the audio input device 226 could be a dynamic, cardioid, super-cardioid, or hyper-cardioid microphone, to capture voice commands that are issued within pre-defined distances and geometries proximate to the set-top box device 202.

Additionally, the processor 204 transmits audio signals corresponding to the audio content to one or more audio output devices, such as speakers 230. In an illustrative, non-limiting embodiment, the processor 204 can transmit the audio signals to the speakers 230 via the audio amplifier 216. The audio amplifier 216 can be, for example, a multi-channel amplifier that communicates with speakers 230, such as stereo speakers, that are integrated within the set-top box device 202.

In a particular embodiment, one or more voice commands 236 are received at the audio input device 226. The one or more voice commands 236 are processed via the voice processor 210, and corresponding commands are transmitted from the voice processor 210 to the processor 204. The processor 204 can process the commands and transmit the processed commands using the computer program 218. In a particular embodiment, the computer program 218 can include instructions to carry out a variety of functions, based at least partially on the one or more voice commands 236 received at the audio input device 226.

For example, the computer program 218 can include instructions to retrieve audio content identified by the one or more voice commands 236. In one embodiment, the computer program 218 can search the audio content files 220 in the memory device 206 and retrieve any audio content files that match or at least substantially match the one or more voice commands 236. In another embodiment, the computer program 218 can submit one or more requests for the audio content to an IPTV system, via the private IPTV access network 222. In this embodiment, the computer program 218 can generate a request and transmit the request to the network interface 208 via the processor 204.

In an illustrative embodiment, the computer program 218 can include instructions to transmit audio content and related data received from internally stored audio content and information files 220, the external private IPTV access network 222, or a combination thereof, to the processor 204. The processor 204 can generate and transmit an audio signal 232 corresponding to the audio content to the audio amplifier 216. Further, the audio amplifier 216 can amplify the signal and transmit the amplified audio signal to the speakers 230. If the audio amplifier 216 is a stereo amplifier, a first channel included in the audio signal may be output to one of the speakers 230 and a second channel included in the audio signal may be output to another speaker 230.

Audio content can include radio content, such as broadcast radio, Internet radio, or satellite radio content; recorded audio content, such as MPEG audio layer 3 (MP3) or Wave files; audio content of a broadcast television program, such as a live or syndicated broadcast program; audio content of a recorded television program, such as a television program recorded via a digital video recorder 238 or a program stored at a server that is accessible via the private IPTV access network 222; audio content of a recorded video program, such as video-on-demand (VOD) content or a movie recorded or stored at a digital video recorder (DVR) 238; or a combination thereof.

Additionally, the computer program 218 can include instructions to transmit data 234 related to the audio content to the display 214 via the processor 204. The data related 234 to the audio content can include a song title, a song collection title, an artist name, a song track number, a user-defined audio file identifier, a radio station frequency, a radio station call letter, a radio station call number, a radio program title, a user-defined radio station identifier, a television station call letter, a television station call number, a television channel number, a television program title, a user-defined television station identifier, a video program title, or a combination thereof.

In a particular embodiment, the audio content may be derived from multimedia content, such as broadcast television content, recorded television content, or video content, such as VOD content, the computer program 218 can also include instructions to command the processor 204 or other suitable device to filter video content out of the multimedia content, such that no video or graphic content is transmitted to the set-top box display interface 212.

Figure 3:
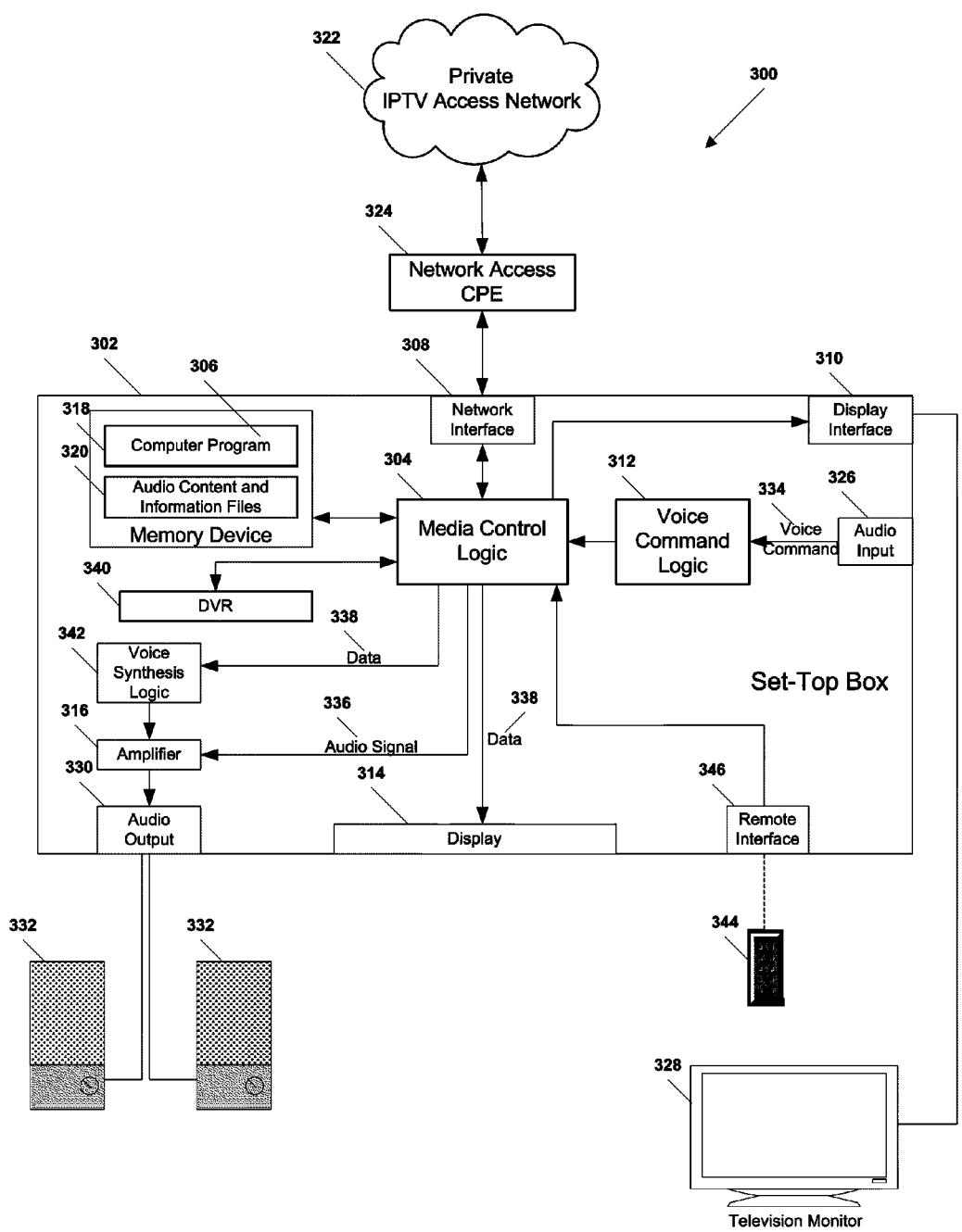
FIG. 3 is a block diagram illustrating a second embodiment of a system to provide audio content.

Referring to FIG. 3, a second embodiment of a system to provide audio content is illustrated and is generally designated 300. The system includes a set-top box 302 that contains a media control logic module 304. A memory device 306 is accessible to the media control logic module 304. Additionally, the media control logic module 304 is coupled to a network interface 308 and a voice command logic module 310.

Further, the media control logic module 304 can be coupled to a display interface 312, such as a television interface, through which the set-top box device 302 can communicate video content to an external television monitor 328. The media control logic module 304 is also coupled to a display 314 that is disposed on a visible side of a housing of the set-top box device 302. In an illustrative embodiment, the media control logic module 304 can be coupled to an audio amplifier 316. Moreover, the media control logic module 304 can be coupled to a voice synthesis logic 342.

In a particular embodiment, the memory device 306 can store a computer program 318. The memory device 306 can also store audio content and information files 320 that include audio content and data related to the audio content. In an illustrative embodiment, the audio content and information files 320 can include a digital music library with metadata associated with each audio file.

In another particular embodiment, the media control logic module 304 can communicate with a private Internet Protocol Television (IPTV) access network 322 via the network interface 308. In an illustrative embodiment, a data interface and network access customer premises equipment (CPE) 324, such as a digital subscriber line (DSL) modem, can facilitate communication between the network interface 308 and the private IPTV access network 322.

In a particular embodiment, the media control logic module 304 is configured to receive audio inputs, such as voice commands 334, from an audio input device 326 via the voice command logic module 310. The audio input device 326 can be a microphone or other transceiver device that is suitable for capturing externally generated audio sounds within a predefined distance and space proximate to the set-top box device 302. The voice command logic module 310 can include logic to separate voice commands 334 from audio output by the speakers 332 or other sounds, for example, through voice recognition or by identifying keywords that precede voice commands 334. Further, the media control logic module 304 can retrieve audio content and related data identified by one or more voice commands 334 from the audio content and information files 320 in the memory device 306, from a server accessible via the private IPTV access network 322, or a combination thereof. In one embodiment, the media control logic module 304 can receive streaming audio via the private IPTV access network 322.

The media control logic module 304 transmits audio signals corresponding to the audio content to one or more audio output devices, such as the speakers 332. In an illustrative, non-limiting embodiment, the media control logic module 304 can transmit the audio signals to the speakers 332 via the audio amplifier 316. The audio amplifier 316 can be, for example, a multi-channel amplifier that communicates with stereo speakers that are coupled to the set-top box device 302 via one or more audio output interfaces, such as the audio output interface 330. In another embodiment, the multi-channel amplifier can communicate with more than two speakers 332, such as a surround sound audio system.

In a particular embodiment, the one or more voice commands 334 are received at the audio input device 326. The one or more voice commands 334 are transmitted to the voice command logic module 310. The voice command logic module 310 can be hardware logic adapted to receive the one or more voice commands 334 from the audio input device 326 and transmit corresponding signals or commands to the media control logic module 304. Alternatively, the voice command logic module 310 can include a device that contains computer-readable instructions to process the one or more voice commands 334 and transmit corresponding signals to the media control logic module 304. In another example, the voice command logic module 310 can be a combination of hardware and computer-readable instructions suited to receive the one or more voice commands 334 from the audio input device 326 and transmit corresponding signals or commands to the media control logic module 304. In one embodiment, the voice command logic module 310 can be a voice card.

The commands or signals that are transmitted by the voice command logic module 310 can be received and processed by the media control logic module 304. In a particular embodiment, the media control logic module 304 can include hardware logic adapted to carry out a variety of functions, based at least partially on the one or more voice commands 334. Alternatively, the media control logic module 304 can include a device that contains computer-readable instructions to perform functions, based at least partially on the one or more voice commands 334. In another embodiment, the media control logic module 304 can include a combination of hardware and computer-readable instructions suited to perform functions, based at least partially on the one or more voice commands 334.

For example, the media control logic module 304 can retrieve audio content and related data identified by the one or more voice commands 334 received at the audio input device 326. In one embodiment, the media control logic module 304 can submit one or more queries to the memory device 306 and retrieve audio content and related data that match or at least substantially match the one or more voice commands 334 from the audio content and information files 320. In another embodiment, the media control logic module 304 can submit one or more requests for the audio content to an IPTV system, via the private IPTV access network 322. In this embodiment, the media control logic module 304 generates one or more requests and transmits the one or more requests to the private IPTV access network 322 via the network interface 308.

In an illustrative embodiment, the media control logic module 304 can include instructions to output audio content and related data received from internally stored audio content and information files 320, the external private IPTV access network 322, or both to the speakers 332. The media control logic module 304 can generate and transmit an audio signal 336 corresponding to the audio content to the audio amplifier 316. Further, the audio amplifier 316 can amplify the audio signal and transmit the amplified signal to the speakers 332 via the audio output interface 330.

Audio content can include radio content, such as broadcast radio, Internet radio, or satellite radio content; recorded audio content, such as MPEG audio layer 3 (MP3) or Wave files; audio content of a broadcast television program, such as a live or syndicated broadcast program; audio content of a recorded television program, such as a television program recorded via a digital video recorder 340 or a program stored at a server that is accessible via the private IPTV access network 322; audio content of a recorded video program, such as video-on-demand (VOD) content or a movie recorded or stored at a DVR 340; or a combination thereof.

Additionally, the media control logic module 304 can transmit data 338 related to the audio content to the display 314. The data 338 related to the audio content can include a song title, a song collection title, an artist name, a song track number, a user-defined audio file identifier, a radio station frequency, call letters of a radio station, a radio station call number, a radio program title, a user-defined radio station identifier, call letters of a television station, a television station call number, a television channel number, a television program title, a user-defined television station identifier, a video program title, or a combination thereof.

In one embodiment, the media control logic module 304 can transmit the data 338 related to the audio content to the voice synthesis logic module 342. The voice synthesis logic module 342 can process the data 338 and generate verbal audio outputs or other sound cues that inform the user of the audio content that is output via the speakers 332. For example, the voice synthesis logic module 342 can speak the name of a song before the song is output. In another example, the voice synthesis logic module 342 can periodically speak the station or call sign of a television or radio station that is being output. The voice synthesis logic module 342 can be used together with, or in place of, the set-top box display 314. Further, the use of the voice synthesis logic module 342 can be selectable by a user via voice command, remote control, or set-top box keys.

In a particular embodiment, the audio content may be derived from multimedia content, such as broadcast television content, recorded television content, or video content, such as VOD content, the media control logic module 304 can filter, or command a suitable device to filter, video content out of the multimedia content, such that no video or graphic content is transmitted to the set-top box display interface 310.

In an exemplary embodiment, the media control logic module 304 can receive the one or more voice commands 334 requesting a list of available audio content or an available group of audio content, such as the tracks on an album, the albums in a music genre, VOD movies in a new release category, television program airing at a specified time, and the like. The media control logic module 304 can retrieve data 338 related to audio content identified by the one or more voice commands 334 received at the audio input device 326. In one embodiment, the media control logic module 304 can submit one or more queries to the memory device 306 and retrieve data 338 that matches or at least substantially matches the one or more voice commands 334 from the audio content and information files 320. In another embodiment, the media control logic module 304 can submit one or more requests for the data 338 to an IPTV system, via the private IPTV access network 322. In this embodiment, the media control logic module 304 generates one or more requests and transmits the one or more requests to the private IPTV access network 322 via the network interface 308.

Additionally, the media control logic module 304 can include instructions to transmit the data 338 to the display 314. The data 338 can be displayed as scrolling text across the display 314, for example, or constituents of a list can be displayed one at a time at the display 314. In another embodiment, the media control logic module 304 can include instructions to transmit the data 338 to the voice synthesis logic module 342. The voice synthesis logic module 342 can process the data 338 and generate verbal audio outputs that inform the user of available audio content that corresponds to the user's request in the one or more voice commands 334. For example, the voice synthesis logic module 342 can speak the name of each song in a musical category. In another example, the voice synthesis logic module 342 can speak the names of each television program airing at a specified time.

In an illustrative, non-limiting embodiment, the media control logic module 304 can receive one or more voice commands 334 requesting a multi-level menu or portion thereof. The media control logic module 304 can retrieve one or more menus identified by the one or more voice commands 334 received at the audio input device 326. Additionally, the media control logic module 304 can include instructions to transmit the menus, or data corresponding to the menus, to the voice synthesis logic module 342. The voice synthesis logic module 342 can process the menu data and generate verbal audio outputs that inform the user of available menu selections and allow the user to navigate through multiple menu levels. For example, if the one or more voice commands 334 are 'main menu,' the set-top box device 302 can output 'say 1 for audio settings; say 2 for music categories; say 3 for radio stations; say 4 for video-on-demand; say 5 for user options,' or other suitable items. In another example, the user can say 'music categories,' and the set-top box device can output 'say 1 for country; say 2 for popular music; say 3 for classical,' and similar verbal statements. In one embodiment, if the user designates classical music by speaking 'three,' a next menu level can be output by the set-top box device, such as, 'say 1 for Mozart; say 2 for Chopin; say 3 for Vivaldi,' and similar verbal statements.

The set-top box device 302 may receive inputs from a remote control 344 via a remote control interface 346, or from similar keys disposed on a side of the set-top box device 302. The inputs can be received in addition to, or in place of, the one or more voice commands 334 and can designate audio content or groups of audio content that the user wishes to hear. Further, the inputs can designate lists of audio content that the user wishes to browse. Additionally, the inputs can request and make selections from multi-level menus, or portions thereof. In an illustrative embodiment, the inputs can indicate whether the user wishes to have data related to audio content displayed via the set-top box display 314 or output verbally via the speakers 332.

Figure 4:
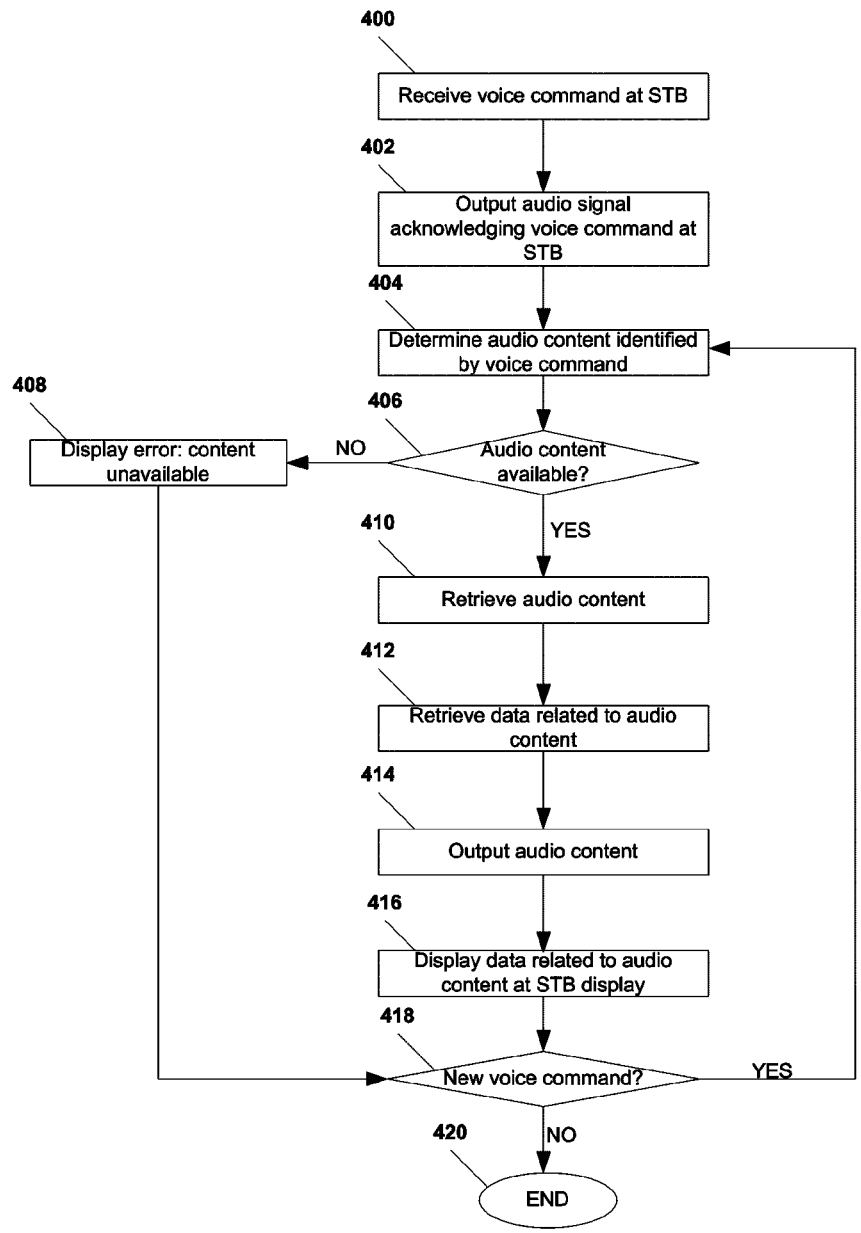
FIG. 4 is a flow diagram illustrating an embodiment of a method of providing audio content.

Referring to FIG. 4, a particular illustrative embodiment of a method of providing audio content is disclosed. At block 400, one or more voice commands are received at a set-top box device. In a particular embodiment, the set-top box device can output a signal at block 402, such as a sound cue or verbal phrase, indicating that the system has received and recognized the one or more voice commands. The one or more voice commands can be received via an audio input device, such as a microphone or other transceiver. In a particular embodiment, the one or more voice commands identify audio content that a speaker wishes to hear. For example, the one or more voice commands can identify a song title, a song collection title, an artist name, a song track number, a user-defined audio file identifier, a radio station frequency, a radio station call letter, a radio station call number, a radio program title, a user-defined radio station identifier, a television station call letter, a television station call number, a television channel number, a television program title, a user-defined television station identifier, a video program title, or a combination thereof.

At block 404, the set-top box determines particular audio content that is identified by the one or more voice commands. This determination can be made by a media control logic module, or a separate processor or computer program, within the set-top box device.

Moving to decision step 406, the set-top box determines whether the audio content identified by the one or more voice commands is available. For example, a media control logic module, or a separate processor or computer program, within the set-top box device can compare the audio content identified by the one or more voice commands with a directory or list of available audio content that is stored in the set-top box memory, at a server accessible to the set-top box device, or a combination thereof. Alternatively, the set-top box device can determine whether the audio content is stored at the set-top box device and submit a query to the server requesting an indication of availability.

If it is determined that the audio content is not available, the method proceeds to block 408, and an error message indicating that the audio content is unavailable is displayed on a set-top box display portion disposed on a visible side of the set-top box device. The method then moves to block 418 and continues as described.

Returning to decision step 406, if the audio content identified by the one or more voice commands is available, then the method continues to block 410, and the audio content is retrieved. The audio content can be retrieved from audio files stored within the set-top box memory. In a particular embodiment, the set-top box device can submit a request to the server for the audio content. Moving to block 412, data related to the audio content is retrieved. The data can be retrieved with the audio content, or separately from the audio content.

Continuing to block 414, the set-top box device outputs the audio content. In a particular embodiment, a media control logic module, or separate processor within the set-top box device, can transmit an audio signal corresponding to the audio content to one or more audio output devices, such as speakers, that are integrated with, or coupled to, the set-top box device. At block 416, the set-top box device displays the data related to the audio content. The set-top box device can transmit the data to a display that is disposed on a visible side of the set-top box device. The set-top box display is separate from a television display that may be coupled to the set-top box device.

Moving to decision step 418, the set-top box determines whether one or more new voice commands have been received. If one or more new voice commands are received, the method returns to block 404. Conversely, if no new voice command is received, the method terminates at 420.

Figure 5:
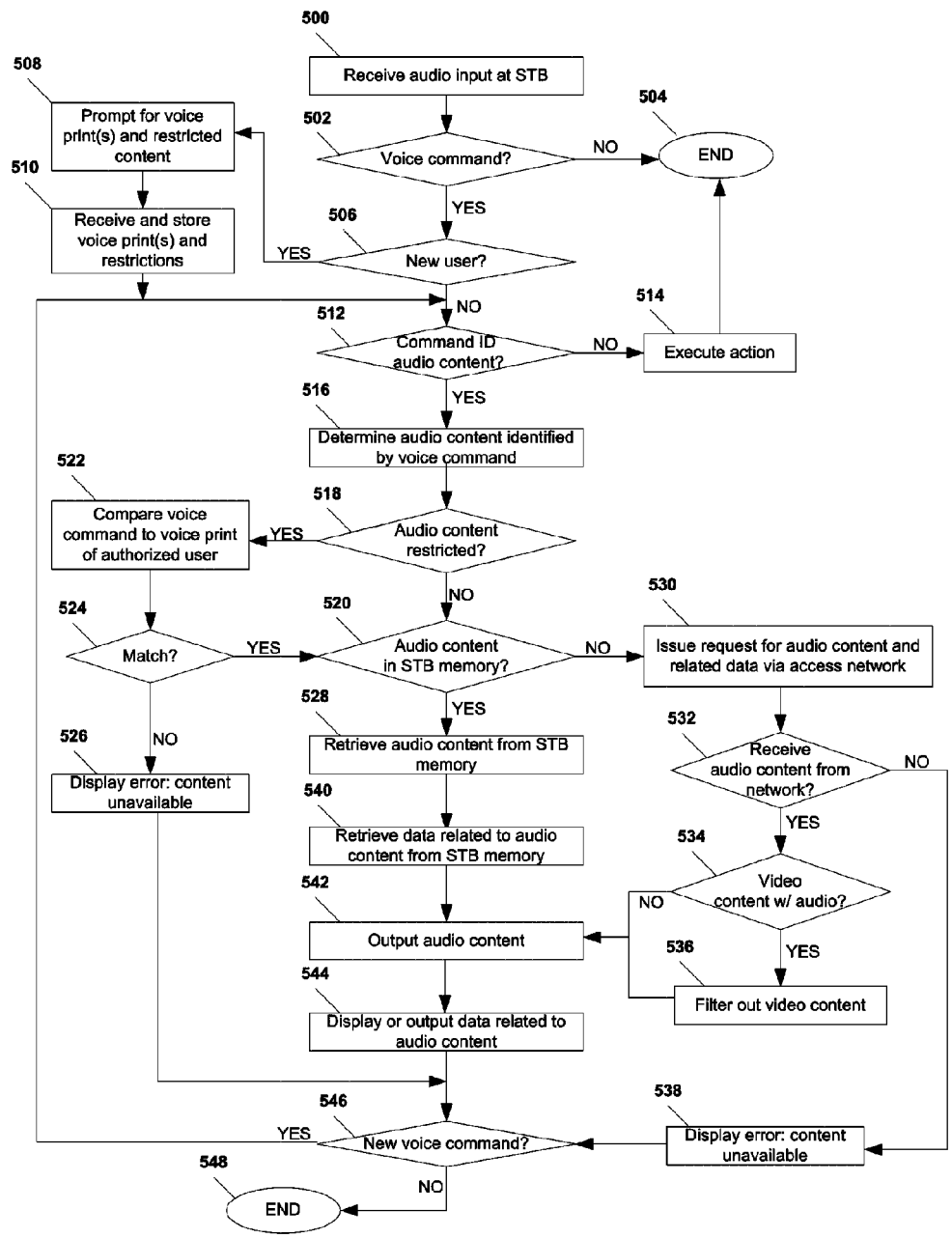
FIG. 5 is a flow diagram illustrating a second embodiment of a method of providing audio content.

Referring to FIG. 5, a second embodiment of a method of providing audio content is illustrated. At block 500, an audio input is received at a set-top box device. The audio input can be received via an audio input device, such as a microphone or other transceiver. At block 502, the set-top box determines whether the audio input includes one or more voice commands that can be processed and executed by the set-top box device. This determination can be made by a computer program embedded in a memory of the set-top box device, by a media control logic module within the set-top box device, by a voice command logic module within the set-top box device, or a combination thereof. If the audio input does not include one or more voice commands, the method terminates at 504. On the other hand, if the audio input includes one or more voice commands, the method proceeds to decision step 506.

At decision step 506, the set-top box device can determine whether the one or more voice commands are received from a new user. For example, a 'new user' voice command can be received at the set-top box device, or the set-top box device can determine that the voice command does not match a voice print that is stored by a memory within the set-top box device. If the one or more voice commands is not received from a new user, the method continues to decision step 512 and continues as described. Conversely, if the one or more voice commands is received from a new user, the method proceeds to block 508. At block 510, the set-top box can prompt the user for one or more voice prints that will be used to identify the user as the source of various voice commands. For instance, the set-top box device can prompt the user for a single voice print, from which the voice character of other commands spoken by the user can be extrapolated. Alternatively, the set-top box device can prompt the user for voice prints for each of a plurality of commands, such as 'play,' 'stop,' 'pause' and the like. In another example, the set-top box device can prompt the user for voice prints for each of a plurality of menu selection identifiers, such as 'one,' 'two,' 'three,' and so on. In a particular embodiment, the set-top box device can prompt the user for designations of any audio content that the user wishes to restrict, such as audio portions of television or other programs that are unsuitable for children. Moving to block 510, the voice prints and any content restrictions are received and stored at the set-top box device. The method then proceeds to decision step 512.

At decision step 512, the set-top box determines whether the one or more voice commands received identify audio content. If the one or more voice commands do not identify audio content, such as a stop command, a pause command, a next track command, a previous track command, a next video program command, a previous video program command, or a combination thereof, then the method proceeds to block 514, and the action identified by the voice command is executed. The method may then terminate at 504.

Returning to decision step 512, if the one or more voice commands identify audio content, the method continues to block 516. The one or more voice commands that identify audio content can include, for example, a song title, a song collection title, an artist name, a song track number, a user-defined audio file identifier, a radio station frequency, call letters of a radio station, a radio station call number, a radio program title, a user-defined radio station identifier, call letters of a television station, a television station call number, a television channel number, a television program title, a user-defined television station identifier, a video program title, or a combination thereof. In a particular embodiment, an action command, such as a play command or a retrieve command, can be combined with an identification of audio content.

Moving to block 516, the set-top box determines the audio content identified by the one or more voice commands. The method continues to decision step 518, and the set-top box determines whether the audio content identified by the one or more voice commands is restricted. In a particular embodiment, the set-top box device can compare the identified audio content with a list or directory of restricted audio content that has been designated by a user at block 508 and 510. If the audio content identified by the one or more voice commands is not restricted, the method continues to decision step 520 and continues as described. On the other hand, if the audio content identified by the voice command is restricted, the method moves to block 522, and the voice command is compared to one or more voice prints of authorized users that are stored in the set-top box memory. At decision step 524, the set-top box device determines whether the one or more voice commands match the voice print or voice prints of an authorized user. If a match is found, the method continues to decision step 520; and, if a match is not found, the method proceeds to block 526, where the audio content is blocked from output, and an error message indicating that the requested audio content is unavailable is transmitted to a display disposed on a visible side of the set-top box device.

Moving to decision step 520, the set-top box device determines whether the audio content identified by the one or more voice commands is stored at the set-top box device. For example, a media control logic module or separate computer program within the set-top box device can compare the audio content identified by the one or more voice commands with a directory or list of available audio content that is stored in the set-top box memory. If the audio content identified by the one or more voice commands is stored in the set-top box memory, the method proceeds to block 528 and continues as described. On the other hand, if the audio content identified by the one or more voice commands is not stored at the set-top box device, the method moves to block 530.

In a particular embodiment, the set-top box can issue a request for the audio content identified by the one or more voice commands and data relating to the audio content to an IPTV system via an access network, at block 530. For example, a media control logic module, or a separate computer program or processor, within the set-top box device can issue the request via a network interface within the set-top box device that is coupled to communicate with an IPTV access network. The method continues to decision step 532, and the set-top box device determines whether it has received the requested audio content and related data. In one embodiment, the set-top box device may receive a response via the access network indicating that the requested audio content is unavailable at the IPTV system. The method then proceeds to block 538, and an error message indicating that the requested audio content is unavailable is transmitted to a display disposed on a visible side of the set-top box device. The method then moves to decision step 546 and continues as described.

Returning to decision step 532, if the set-top box determines that it has received the requested audio content and related data via the access network, the method proceeds to decision step 534. At decision step 534, the set-top box determines whether the audio content is derived from multimedia content, such that the set-top box has received video content with the audio content. For instance, where the voice command indicates that the user desires to listen to the audio portion of a television broadcast program, the set-top box device can receive the multimedia content of the television broadcast program in response to the request issued at block 530. When the set-top box receives only audio content, the method moves to block 542, and continues as described. When the set-top box receives multimedia content, the method moves to block 536, and the set-top box device filters out the video content to retrieve the audio content via the media control logic module, or a separate processor, filter, or computer program, within the set-top box device. The method then proceeds to block 542.

Returning to decision step 520, if the audio content identified by the one or more voice commands is stored at the set-top box device, the method continues to block 528, and the audio content is retrieved from the set-top box memory. Moving to block 540, data related to the audio content is also retrieved from the set-top box memory. The data can be retrieved with the audio content, or separately from the audio content.

Continuing to block 542, the set-top box device outputs the audio content retrieved from the set-top box memory, at block 538, or received via the IPTV access network, at decision step 532. In a particular embodiment, a processor or media control logic module can transmit an audio signal corresponding to the audio content to one or more audio output devices, such as speakers, that are integrated with, or coupled to, the set-top box device. At block 544, the set-top box device displays, outputs, or displays and outputs, the data related to the audio content. The set-top box device can transmit the data to the display that is disposed on a visible side, such as a front panel, of the set-top box device. In one embodiment, the set-top box device can output the data related to the audio content, for example, as verbal audio outputs.

Moving to decision step 546, the set-top box determines whether one or more new voice commands have been received. If one or more new voice commands are received, the method returns to block 512. Conversely, if no new voice command is received, the method terminates at 518.

Figure 6:
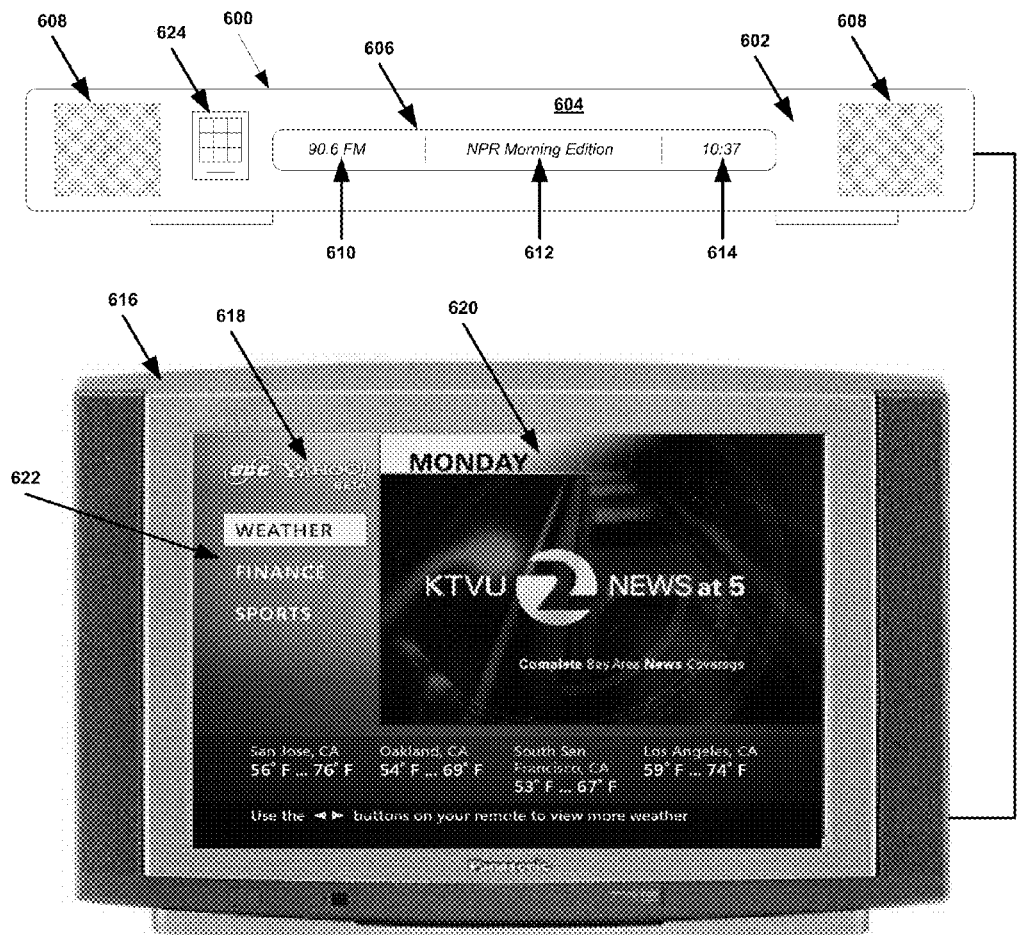
FIG. 6 is a diagram of an embodiment of a set-top box device.

Referring to FIG. 6, an embodiment of a set-top box device is illustrated and is generally designated 600. The set-top box device 600 includes a housing 602 having at least one visible side, such as the visible side 604. In a particular embodiment, a display 606 is disposed on the visible side 604. Additionally, one or more speakers 608 can be integrated with or coupled to the housing 602. In one embodiment, the set-top box device 600 can include a keypad 624, which a user may use to input selections and other commands to the set-top box device 600.

In an illustrative embodiment, the display 606 can contain a plurality of fields 610, 612, 614. Each field can display a portion of data related to audio content that is output via the speakers 608. For example, if live radio content is broadcast via the speakers 608, the display can include a frequency of a radio station at the field 610; a radio program title at the filed 612; and a time of day, or an amount of time that the audio content has been output, at the field 614.

As illustrated, the set-top box device 600 can be coupled to an external display device, such as a television monitor 616. In an illustrative, non-limiting embodiment, the set-top box device 602 can be adapted to transmit a user interface 618 to the television monitor 616. The user interface 618 can include a plurality of regions, such as a video content display region 620 and an informational content selection region 622.

Many users may prefer to listen to audio content when conducting other activities. For instance, a user may wish to listen to a television news program, while reading or supervising children. Alternatively, a user may prefer to output only the audio content associated with a music video channel at a party, or where the video content may be unsuitable for children who are near the television monitor. In another example, users may wish to save power consumption associated with television monitors, by not displaying a screen associated with a music content channel. Nonetheless, users may desire to access many forms of audio content, including audio portions of broadcast television programs, Internet radio, satellite radio, recorded music, or recorded television or video programs, without proximity to, or manipulation of, separate electronic components.

Thus, in accordance with the various embodiments, the systems and methods described herein provide both stored and broadcast audio content that may be retrieved in response to voice commands received at a set-top box device. The audio content can be stored at the set-top box device or received from an IPTV system, or both. Additionally, video or graphic content, including content associated with multimedia content, may be blocked from display at a display device external to the set-top box device while the audio content is output. Data related to the audio content is displayed at a set-top box display disposed on a visible side of the set-top box device.

Figure 7:
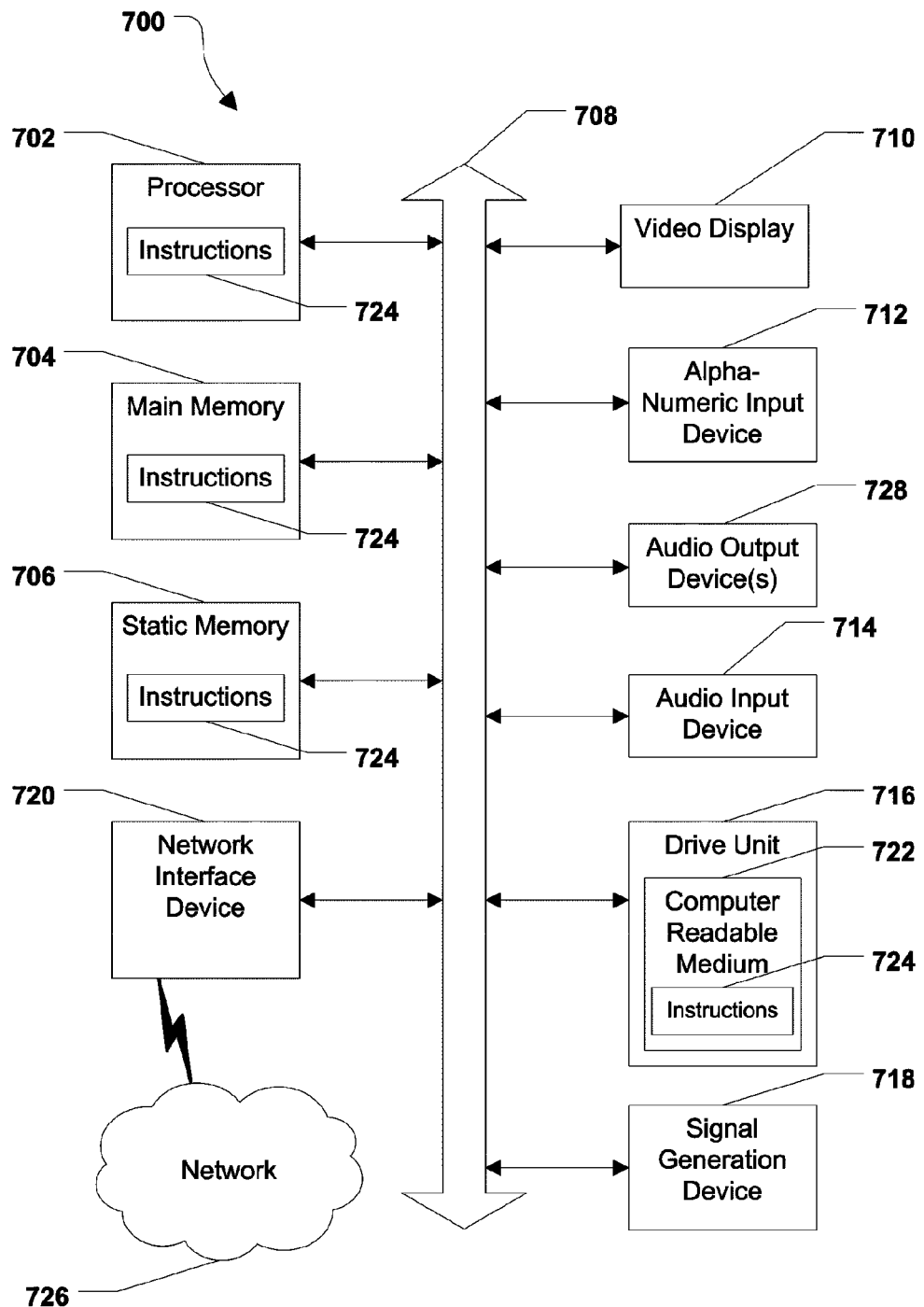
FIG. 7 is a diagram of an embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein in connection with the set-top box device. The computer system 700, or any portion thereof, may operate as a standalone device or may be a hardware or software module within a server or set-top box device, as illustrated in FIGS. 1-3.

In a networked deployment, the computer system may operate in the capacity of an IPTV server or set-top box device. The computer system 700 can also be implemented as or incorporated into various other devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide audio, video or data communication. Further, while a single computer system 700 is illustrated, the term "system" shall also be taken to include any collection of systems or sub-systems that individually or jointly execute a set, or multiple sets, of instructions to perform one or more computer functions, such as the IPTV system illustrated in FIG. 1.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as an input control panel, and an audio input device 714, such as a microphone. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal so that a device connected to a network 726 can communicate audio, video or data over the network 726. Further, the instructions 724 may be transmitted or received over the network 726 via the network interface device 720.

The computer system 700 may include one or more output devices 728, such as speakers, which are integrated within the computer system 700 or coupled to the computer system 700.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In a particular embodiment, the steps of the methods described herein are executed in the order shown by the figures. In alternative embodiments, the steps may be executed in alternative sequences.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A set-top box device comprising:
a processor;
a display interface coupled to the processor, wherein the display interface is configured to send video output to an external display device coupled to the display interface;
a remote control interface coupled to the processor, wherein the remote control interface is configured to receive input from a remote control, wherein the input identifies media content that includes first audio content and first video content, and wherein the input indicates that the first audio content is to be output via an audio output device without sending the first video content to the external display device via the display interface; and
a media control module, wherein the media control module is executable by the processor to perform operations including:
sending an audio confirmation signal confirming receipt of the input via the audio output device;
retrieving the media content identified by the input; and
sending an audio signal corresponding to the first audio content to the audio output device without sending the first video content to the external display device.

2. The set-top box device of claim 1, further comprising a display disposed on a side of a housing that includes the processor, wherein the display is distinct from the external display device, and wherein the operations further include:
retrieving metadata descriptive of the first audio content; and
sending at least a portion of the metadata to the display.

3. The set-top box device of claim 1, further comprising a local memory coupled to the processor, wherein the local memory is configured to store a plurality of media content files.

4. The set-top box device of claim 3, further comprising a network interface to communicate with a content provider, wherein the network interface is responsive to the processor to send a request for the media content when the media content is not stored as one of the plurality of media content files in the local memory.

5. The set-top box device of claim 1, further comprising an audio input interface configured to receive voice commands from an audio input device.

6. The set-top box device of claim 5, wherein the audio input device comprises a microphone configured to capture the voice commands when the voice commands are spoken within a predefined distance of the set-top box device.

7. The set-top box device of claim 5, wherein the operations further include sending the audio signal when a voice input received via the audio input device substantially matches a stored voice print of a user authorized to retrieve the media content, wherein the media content is restricted media content.

8. The set-top box device of claim 5, wherein the operations further include blocking the audio signal from being sent to the audio output device when a voice input received via the audio input device does not substantially match a stored voice print of a user authorized to retrieve the media content and when the media content is restricted media content.

9. A method comprising:
receiving input from a remote control device at a set-top box device, wherein the input identifies media content that includes audio content and video content, and wherein the input indicates that the audio content is to be output via an audio output device coupled to the set-top box device without sending the video content from the set-top box device to an external display device coupled to the set-top box device;
determining whether the media content is stored at a local memory device of the set-top box device; and
when the media content is stored at the local memory device:
retrieving the media content from the local memory device;
sending a first audio signal corresponding to the audio content of the media content to the audio output device; and
blocking output of the video content to the external display device.

10. The method of claim 9, further comprising sending metadata descriptive of the audio content to a display disposed on a side of the set-top box device, wherein the display is distinct from the external display device.

11. The method of claim 9, further comprising sending an audio cue that identifies the audio content to the audio device before sending the first audio signal.

12. The method of claim 9, further comprising sending a request to a server for the media content when the media content is not stored at the local memory device.

13. The method of claim 12, further comprising:
receiving the media content from the server;
sending a second audio signal corresponding to the audio content of the media content to the audio output device; and
blocking output of the video content to the external display device.

14. The method of claim 13, further comprising sending an audio cue that identifies the audio content before sending the second audio signal.

15. The method of claim 12, further comprising sending an error message to a display disposed on a side of the set-top box device when the media content is not available from the server, wherein the display is distinct from the external display device.

16. The method of claim 9, wherein blocking output of the video content comprises filtering the media content to remove the video content before sending the first audio signal to the audio output device.

17. A computer-readable storage device comprising instructions, that when executed by a processor, cause the processor to perform operations including:

receiving input at a set-top box device, wherein the input identifies media content that includes audio content and video content, and wherein the input indicates that the audio content is to be output via an audio output device coupled to the set-top box device without video output being sent to an external display device coupled to the set-top box device;

retrieving retrieve the media content from a local memory device of the set-top box device when the media content is stored at the local memory device;

retrieving the media content from a content provider via a network when the media content is not stored at the local memory device;

blocking output of the video output to the external display device; and sending an audio signal corresponding to the audio output to the audio output device.

18. The computer-readable storage device of claim 17, wherein the input is received via a remote control device.

19. The computer-readable storage device of claim 17, wherein the input is received as one or more voice commands via an audio input device.

20. The computer-readable storage device of claim 17, wherein the operations further include outputting an audio confirmation signal that indicates receipt of the input before the audio signal is sent to the audio output device.

* * * * *